United States Patent [19]

Faraci et al.

[11] Patent Number: 5,724,934
[45] Date of Patent: Mar. 10, 1998

[54] MODULAR ROTARY ENGINE, AND OIL SLINGER AND RACE SEAL SUBASSEMBLIES THEREOF

[76] Inventors: John A. Faraci, 2615 Shenandoah Ave., Durham, N.C. 27704; Anthony J. Nino, 4408 Regis Ave., Durham, N.C. 27705

[21] Appl. No.: 651,687

[22] Filed: May 21, 1996

Related U.S. Application Data

[63] Continuation-in-part of Ser. No. 143,088, Oct. 26, 1993, Pat. No. 5,517,816.

[51] Int. Cl.⁶ ........................................................ F01M 9/06
[52] U.S. Cl. ........................ 123/196 R; 184/6.5; 384/465
[58] Field of Search .......................... 123/196 R, 196 CP; 184/5, 5.1, 6.5, 6.16, 43; 384/46 S

[56] References Cited

U.S. PATENT DOCUMENTS

| | | | |
|---|---|---|---|
| 3,359,952 | 12/1967 | Jones et al. | 123/196 R |
| 3,903,992 | 9/1975 | Chivukula et al. | 184/5.1 |
| 4,400,040 | 8/1983 | Toth et al. | 384/465 |
| 5,555,956 | 9/1996 | Voss et al. | 184/6.16 |

FOREIGN PATENT DOCUMENTS

| | | | |
|---|---|---|---|
| 0232978 | 8/1987 | European Pat. Off. | 384/465 |
| 52-59248 | 5/1977 | Japan | 384/465 |
| 1300216 | 3/1987 | U.S.S.R. | 384/465 |
| 2091356 | 7/1982 | United Kingdom | 184/6.16 |

*Primary Examiner*—Erick R. Solis
*Attorney, Agent, or Firm*—Steven J. Hultquist

[57] ABSTRACT

A combustion engine comprising a lubricated bearing mountable on the shaft of the engine, and a race/seal bearing plug engagable therewith and engagable with a housing member of the engine. The race/seal bearing plug comprises lubricant passage therein dispensing lubricant medium to the bearing, with the bearing discharging lubricant to a lubricant slinger which serves to centrifugally direct the lubricant to a peripheral collection channel for recirculation to the lubricant flow passages in the bearing plug.

18 Claims, 10 Drawing Sheets

MODULAR ROTARY ENGINE, AND OIL SLINGER AND RACE SEAL SUBASSEMBLIES THEREOF

CROSS REFERENCE TO RELATED APPLICATION

This is a continuation-in-part of U.S. application Ser. No. 08/143,088 filed Oct. 26, 1993 and issued May 21, 1996 as U.S. Pat. No. 5,517,816.

BACKGROUND OF THE INVENTION

1. Field of the Invention

This invention relates generally to rotary combustion engines. More specifically, the invention relates to oil slinger and race seal subassemblies for an engine of such type, and to a rotary combustion engine comprising same.

2. Description of the Related Art

The state of the art relative to the field of the invention is more fully described in our U.S. Pat. No. 5,517,816 issued May 21, 1996.

SUMMARY OF THE INVENTION

The present invention relates generally to rotary-type combustion engines, to subassemblies thereof, and to a method of carrying out combustion in an engine for generation of motive power therefrom.

In one aspect, the invention relates to an oil slinger, for pumping oil in a rotary engine, by use of centrifugal force. The oil slinger may comprise a disc-shaped body which can be of various configurations, being rough, or smooth, or ridged, or vaned, as may be desired in the given end use application of the invention. The oil slinger can be solid, permeable, or spoked. The surface of the oil slinger may be flat or curved, and the oil slinger is arranged in the engine to receive lubricant, with an inlet for the lubricant, which may be of liquid or slurry form, at or near the center shaft of the engine. The lubricant medium after being dispensed to the oil slinger is accelerated outward to the periphery of the oil slinger, and may be expelled out through the passages located at or near the edge of the disc.

In another aspect, the invention relates to a rotary engine comprising a race/seal assembly, constituting a single-piece multi-duty unit. The race/seal assembly provides a leak-proof seal along the shaft, using a spring-loaded rubber lip that encircles the shaft. The rubber lip may be molded permanently to the body of the unit, with a spring located inside the unit, running in a groove molded into the seal lip. The race/seal assembly is advantageously arranged to exert pressure on a tapered bearing supporting the main shaft of the engine. The race/seal assembly desirably is externally threaded and has a machined surface to accommodate usage of common tools to secure (screw in) the unit, and to measure the pre-load on the bearing. The race/seal assembly has a race at its central portion to provide a smooth rolling surface for the bearing. The race/seal assembly may have passages drilled through it, to allow the flow of a lubricant therethrough to reduce the wear on the bearing and race.

Other aspect and advantages of the invention will be more fully apparent from the ensuing disclosure and appended claims.

DETAILED DESCRIPTION OF THE INVENTION, AND PREFERRED EMBODIMENTS THEREOF

The disclosure of prior copending U.S. patent application Ser. No. 08/143,088 filed Oct. 26, 1993, and issued May 21, 1996 as U.S. Pat. No. 5,517,816, hereby is incorporated herein by reference in its entirety, and the priority of said prior copending application hereby is claimed.

Figure 1:
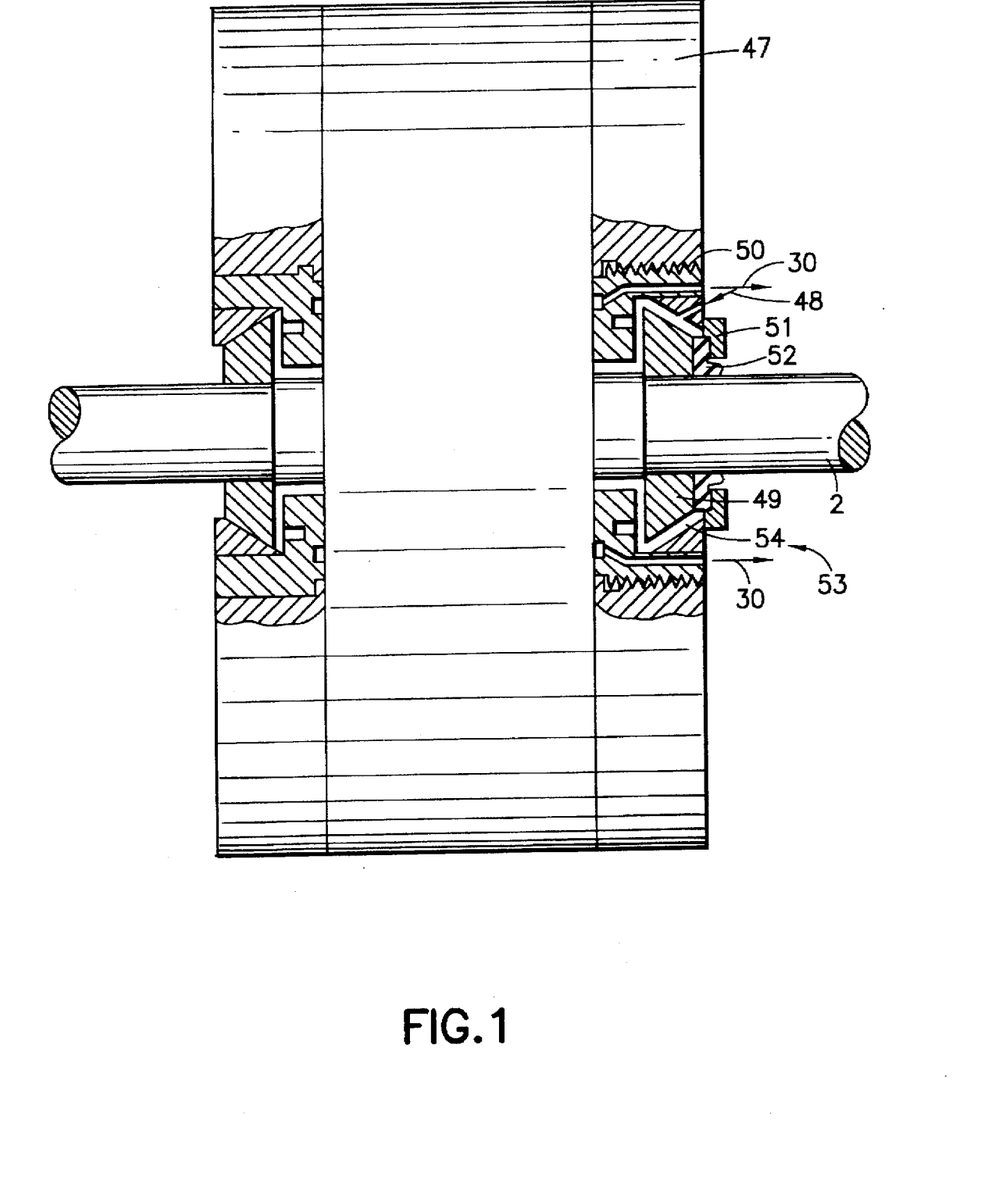
FIG. 1 is a side elevation view of a rotary engine including engine covers, each with a removable threaded plug and bearing assembly, according to one embodiment of the invention.

Referring now to the drawings, FIG. 1 is a side elevation view of a rotary engine including engine covers, each with a removable threaded plug and bearing assembly, according to one embodiment of the invention.

FIG. 1 shows the arrangement of the rotor shaft 2 and associated elements of the engine. The engine cover 47 includes aperture 48 therein for introduction of oil therethrough to the bearing 49 around the rotor shaft 2 and into the oil slinger (not shown in FIG. 1). Apertures 30 permit oil to flow out of the engine cover from the recess circumscribing the oil slinger, as hereinafter more fully described. A hex nut 51 retains a seal gasket 52 around the shaft 2.

The seal gasket 52 may be formed of any suitable material of construction of appropriate diameter, resilience, and physical characteristics.

As shown, cover 47 is provided at its central opening with threading 50, which is complementarily matable with threading of plug 53 containing the oil outlet passages 30. Race 54 accommodates bearing 49 and low pressure oil inlet 48 communicates with the race 54, to effectuate contacting of lubricant with the bearing.

The low pressure oil inlet 48 is suitably connected to an oil filter and lubricant reservoir (not shown) providing a gravity-feed lubrication system for the rotary engine.

Figure 2:
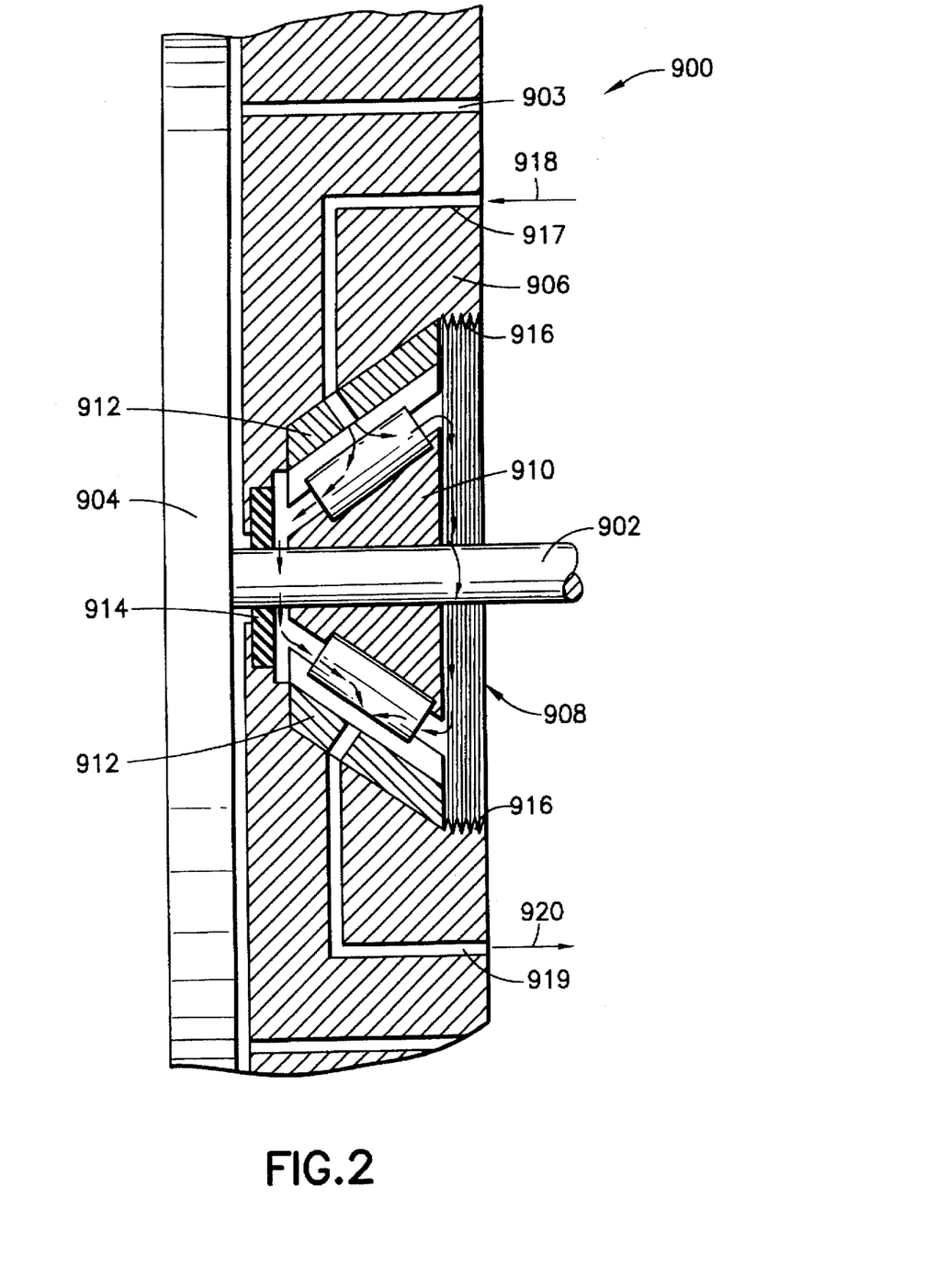
FIG. 2 is a partial sectional elevation view of a bearing and seal assembly of a rotary engine according to another embodiment of the invention.

FIG. 2 is a partial sectional elevation view of a bearing and seal assembly of a rotary engine 900 according to another embodiment of the invention. The rotary engine 900 comprises a shaft 902 coupled to a "pinwheel" 904 which may be fabricated with a vaned structure. The cover 906 of the engine 900 features a bearing cavity 908 which is threaded at its outer circumference portion 916, as shown.

The bearing cavity 908 contains a roller bearing 910 mounted on shaft 902, adjacent to race 912 accommodating such bearing. A seal element 914 is provided at a lower portion of the bearing cavity 908, passing through race 912 for discharge of oil onto the roller bearing 910, with the flow of oil over the bearing 910 and shaft 902 being indicated by arrows. The oil after traversing the roller bearing 910 and shaft 902 passes through a passage in race 912 opposite the feed passage 917 (into which oil is flowed in the direction indicated by arrow 918), and the oil is finally flowed through discharge passage 919 for outflow from passage 919 in the direction indicated by arrow 920. The cover 906 is provided at its upper portion with a test passage 903, to test the sealing character of the seal ring element 914.

Figure 3:
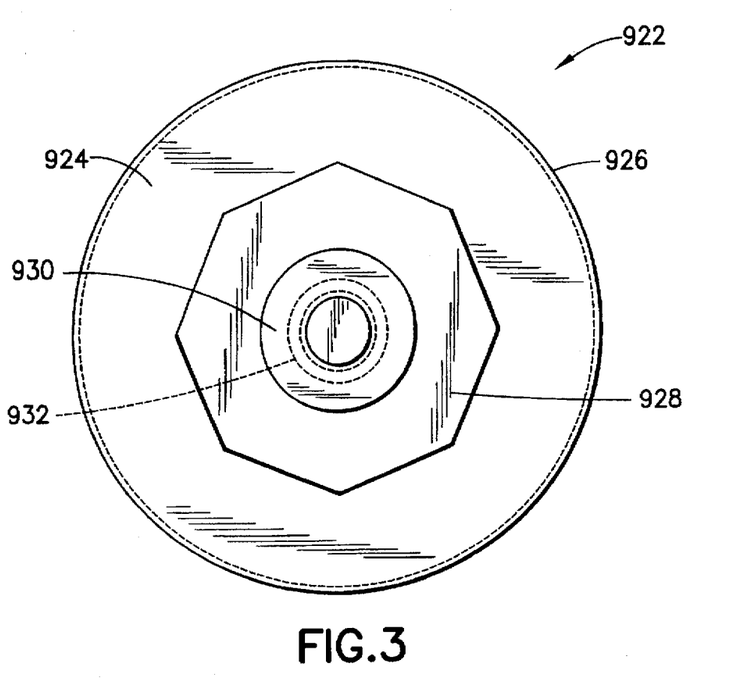
FIG. 3 is a front elevation view of a plug unit adapted to be coupled with the bearing and seal assembly of FIG. 2.

FIG. 3 is a front elevation view of a plug unit adapted to be coupled with the bearing and seal assembly of FIG. 2. For such purpose, the plug unit 922 is provided with a threaded outer peripheral surface 926 engaging the threaded outer portion of the bearing cavity 908 (see FIG. 2). The main body portion 924 of plug 922 features on its face a hexagonal nut protrusion 928, for engagement with a wrench or similar means, to effect removal or installation of the plug in the bearing cavity. The hexagonal nut protrusion 928 circumscribes a rubber seal element 930, which is shaped as shown in FIG. 4 to contain therein a spring tensioning element 932 causing the rubber seal element to circumferentially compressively bear on shaft 902.

Figure 4:
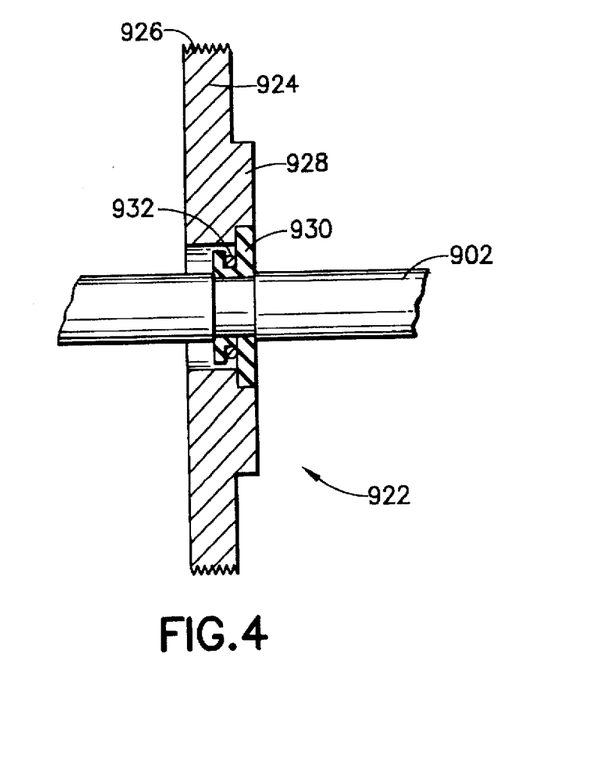
FIG. 4 is a partial section elevation view of the plug unit of FIG. 3 in operative position on a rotary engine shaft.

As shown in FIG. 4, the body 924 of plug 922 is provided with threading on its outer peripheral surface 926, by means of which the plug is readily threadably engaged with the threaded outer surface portion 916 of the bearing cavity 908. By this arrangement, the plug is readily installable in the bearing cavity, and is correspondingly readily removed therefrom, to access the roller bearing 910 and the seal ring element 914. When the plug 922 is removed from the bearing cavity 908, a fluid test medium can be introduced under pressure to test passage 903 and thereby utilized to determine the sealing character of the seal ring element 914.

Figure 5:
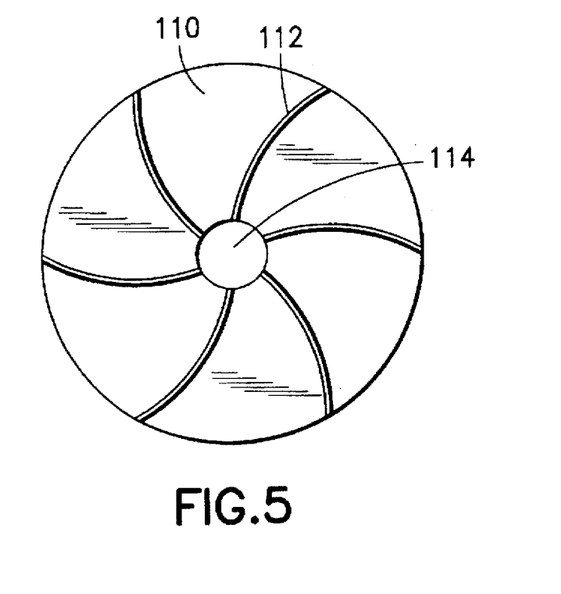
FIG. 5 is a top plan view of an oil slinger according to one embodiment of the invention.
Figure 6:
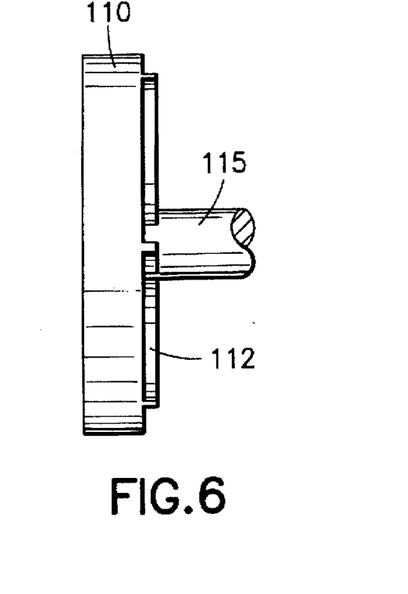
FIG. 6 is a side elevation view of the oil slinger device of FIG. 5.

FIG. 5 is a top plan view of an oil slinger 110 according to one embodiment of the invention, featuring vanes 112 of a swept-back character, of arcuate profile. The oil slinger 110 comprises a main body portion of disc-shape, with a central opening 114. FIG. 6 is a side elevation view of the oil slinger device of FIG. 5, as mounted on shaft 115.

Figure 7:
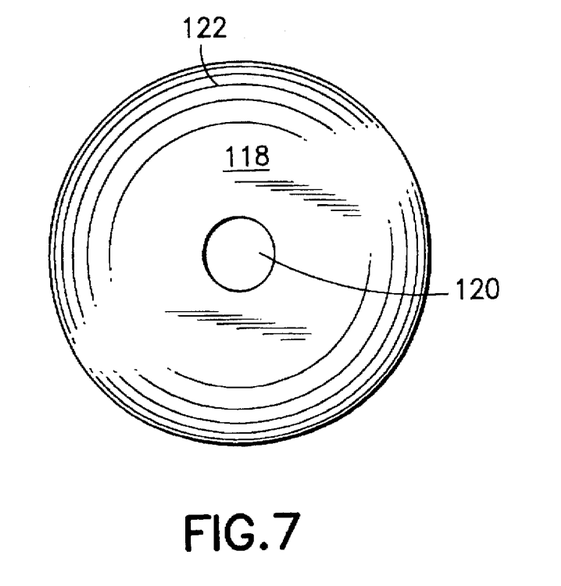
FIG. 7 is a top plan view of another illustrative oil slinger in accordance with the invention.
Figure 8:
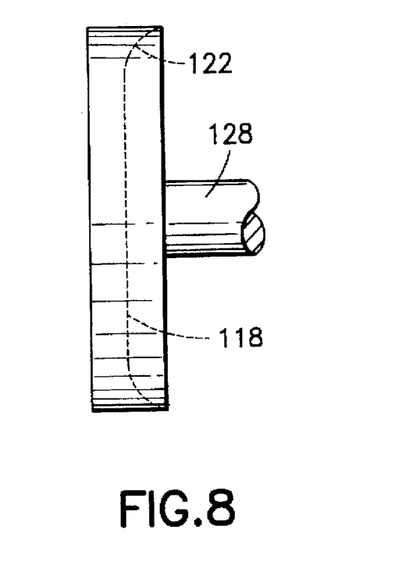
FIG. 8 is a side elevation view of the oil slinger device of FIG. 7.

FIG. 7 is a top plan view of another illustrative oil slinger 122 in accordance with the invention, of disc-shape with a main flat surface 118, a central opening 120 to accommodate installation of the oil slinger on the shaft of the engine, and an upwardly beveled peripheral edge as shown in the corresponding side elevation view of FIG. 8, as mounted on shaft 128 (e.g., by suitable keying or other mechanical affixation).

Figure 9:
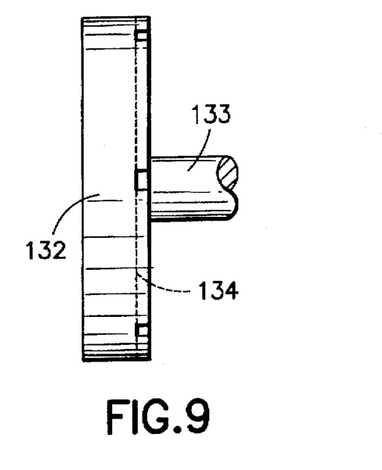
FIG. 9 is a side elevation view of a further illustrative oil slinger device of the invention.
Figure 10:
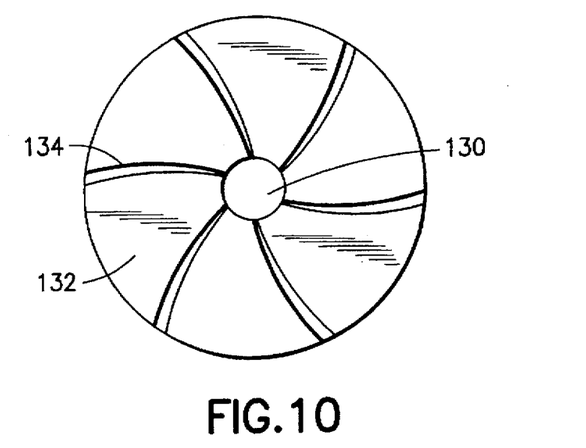
FIG. 10 is a top plan view of the oil slinger device of FIG. 9.

FIG. 9 is a side elevation view of a further illustrative oil slinger device 132 of the invention, as shown in top plan view in FIG. 10. The device comprises a disc-shaped main body with depressed vanes 134 on its surface, formed as swept-back grooved elements on the face, with a central opening 130, for mounting the device 132 on shaft 133 as shown in FIG. 9.

Figure 11:
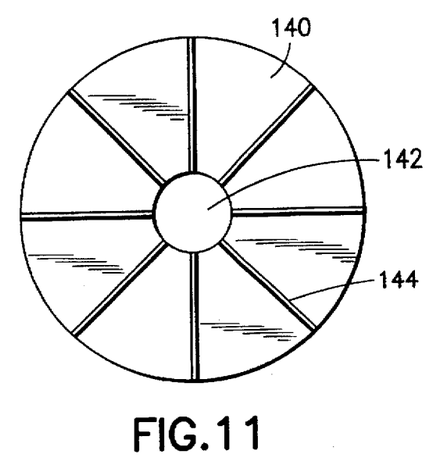
FIG. 11 is a top plan view of yet another oil slinger device.

FIG. 11 is a top plan view of yet another oil slinger device 140 featuring straight radial vanes 144 arranged around a central opening 142. The vanes may either protrude upwardly from the main flat top surface of the oil slinger or else constitute grooved vanes in the disc member.

Figure 12:
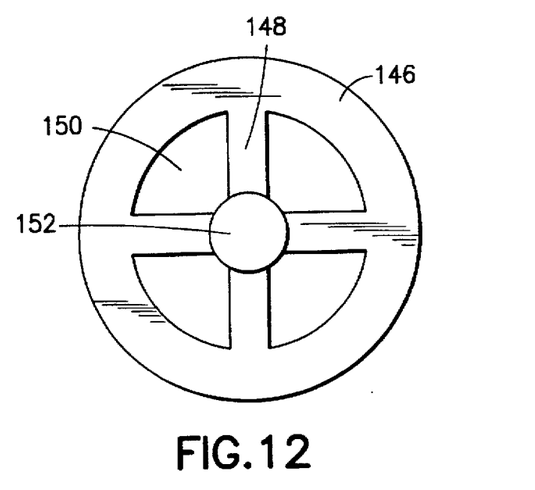
FIG. 12 is a top plan view of a spoked oil slinger device according to a further embodiment of the invention.

FIG. 12 is a top plan view of a spoked oil slinger device 146 according to a further embodiment oft he invention, comprising spoke elements 148 alternating with sector-shaped openings 150. As shown, the oil slinger device is mounted for rotation on shaft 152.

Figure 13:
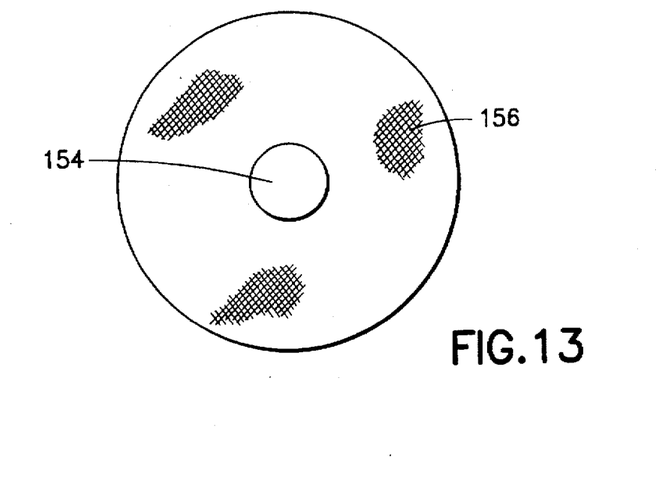
FIG. 13 is a top plan view of another oil slinger device according to the invention.

FIG. 13 is a top plan view of another oil slinger device 156 according to the invention, as mounted on shaft 154. The main disc-shaped body of the oil slinger in this embodiment is a semi-permeable, porous material disc, onto which the lubricant can be dispensed for centrifugal "throw" thereof in the interior volume of the engine containing the oil slinger mounted on shaft 154.

Figure 14:
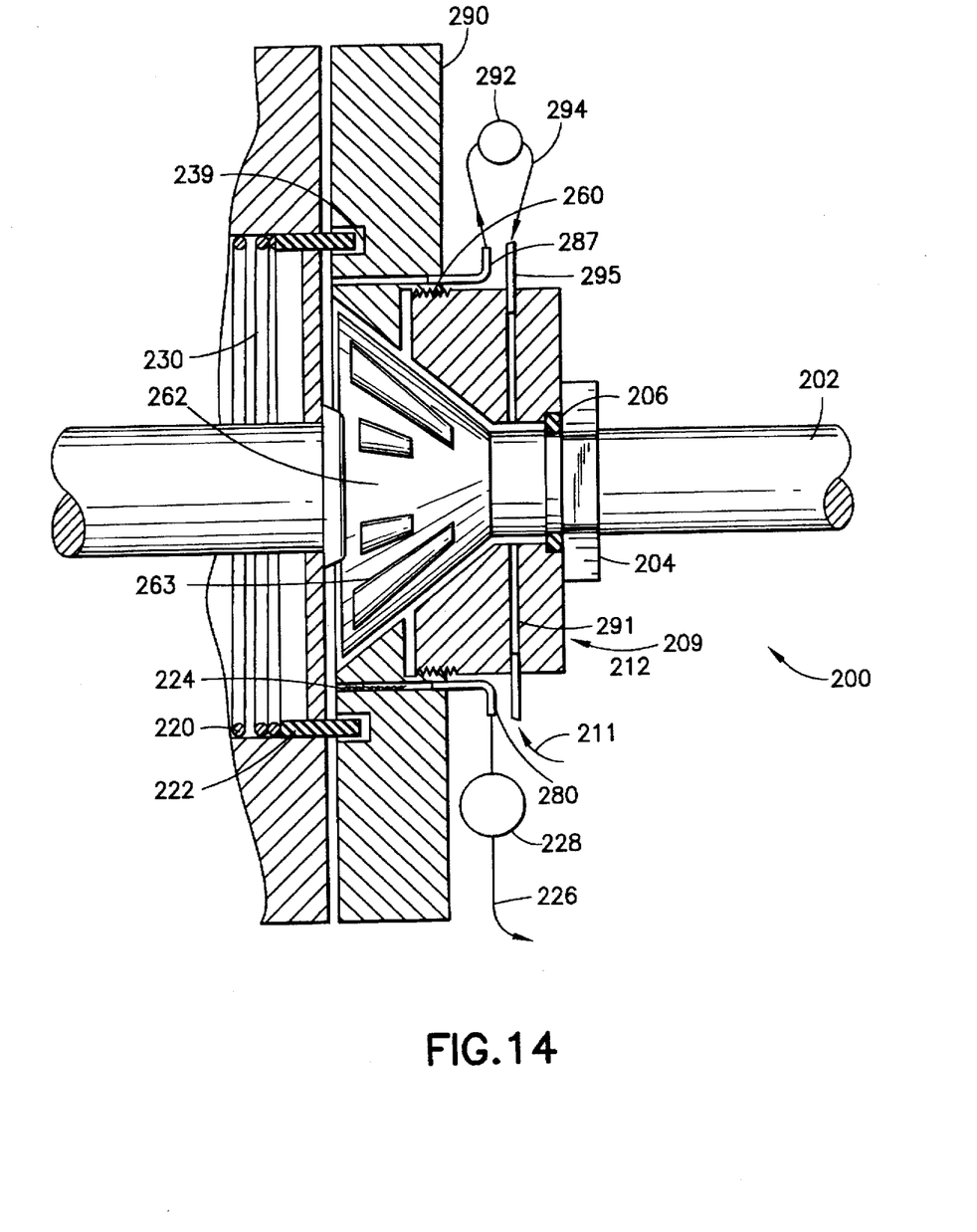
FIG. 14 is a side elevation view in section, of a rotary combustion engine according to the invention, showing the details of the oil slinger and race bearing assembly.

FIG. 14 is a side elevation view in section, of a rotary combustion engine according to the invention, showing the details of the oil slinger 230 and race bearing assembly. The engine comprises a side block 290 having groove 239 therein. A shaft 202 passes through the engine as illustrated, and has a rotor mounted thereon for rotation therewith. The rotor is circumscribed in the engine block by a series of suitably arranged combustion chambers and fuel injection and air-fuel mixing means. The bearing plug 209 is threaded with threads 260 on its periphery, for threadable engagement with the side block 290.

The bearing plug secures the bearing 262 in position as shown. Bearing 262 comprises a series of roller bearing elements 263. The bearing on its front face is secured by tightening nut 204.

Oil is introduced to interior plug line 291 flowing thereinto in the direction indicated by arrow 211, and circulating through the plug and over the bearing surfaces, with the oil slinger 230 serving to centrifugally direct oil flow 224 to the outer oil flow passage communicating with oil discharge line 280, for passage in line 226 through the oil filter unit 228, and recirculation to the line 291. In like manner, the centrifugally distributed oil flows from the outer oil flow passage on the other side of the assembly into the oil discharge line 287 for filtration in filter 292 (which may be consolidated with the filter 228, in the form of a single unitary filter for the engine lubricant), and return in the direction indicated by arrow 294 to the line 295 for recirculation of the lubricant medium.

The plug is sealed against oil leakage by seals 206, and seal elements 222 are provided in the groove 239 of the side block of the engine, with spring loaded seal element 220 serving to complete such assembly.

The oil slinger 230 in this embodiment may comprise a disc-shaped member of a type as described hereinabove, with either raised or grooved vane structure.

Figure 15:
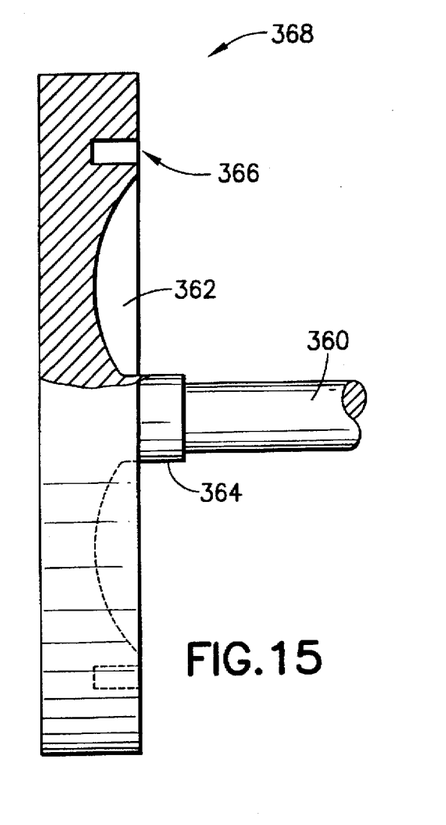
FIG. 15 is a side elevation view of the oil slinger and shaft of the engine according to a further embodiment of the invention.

FIG. 15 is a side elevation view of a pinwheel rotor 368 and oil slinger 362 thereof, as mounted at collar 364 on shaft 360 of the engine. A seal groove 366 is provided in the rotor, to accommodate a sealing element therein (see seal element 222 in FIG. 14).

Figure 16:
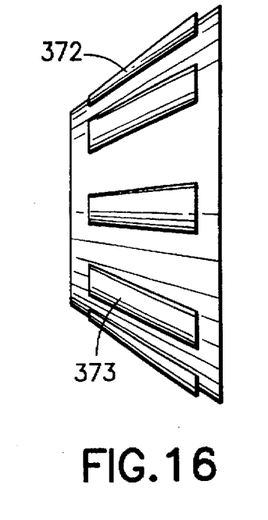
FIGS. 16–18 are side, back and front views of a tapered bearing, such as may be employed in the rotary engine of the present invention.
Figure 17:
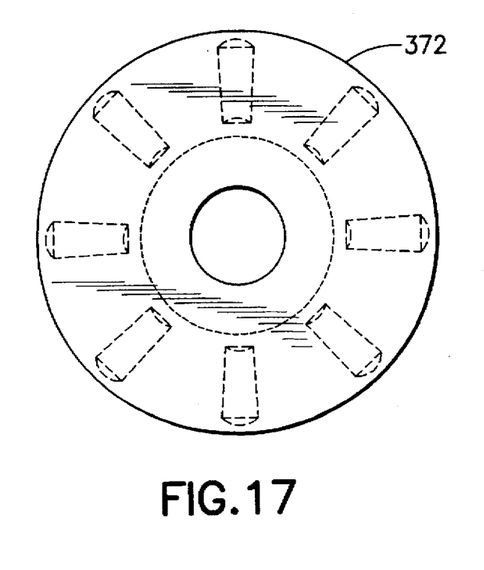
Figure 18:
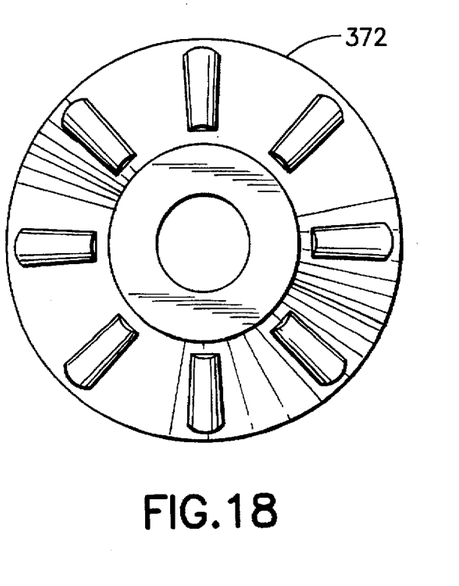

FIGS. 16-18 are side, back and front views of a tapered bearing 372, such as may be employed in the rotary engine of the present invention, featuring a series of roller bearing elements 373 on its tapered side surface.

Figure 19:
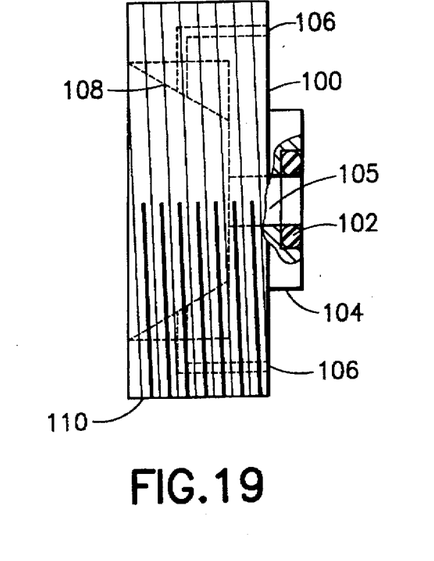
FIG. 19 is a side elevation view of the race/seal assembly, according to one embodiment of the invention.

FIG. 19 is a side elevation view of the race/seal assembly, according to one embodiment of the invention.

As shown in FIG. 19, the race/seal assembly comprises a metal body 100 of the shape shown, featuring a threaded peripheral surface 110, and a race 108, which may be pressed into place in the receiving cavity of the metal body. The race/seal assembly comprises oil passages 106 therein. The metal body has a hex surface 104 on its front face, with a cavity therein receiving a rubber seal element 102 as illustrated.

Figure 20:
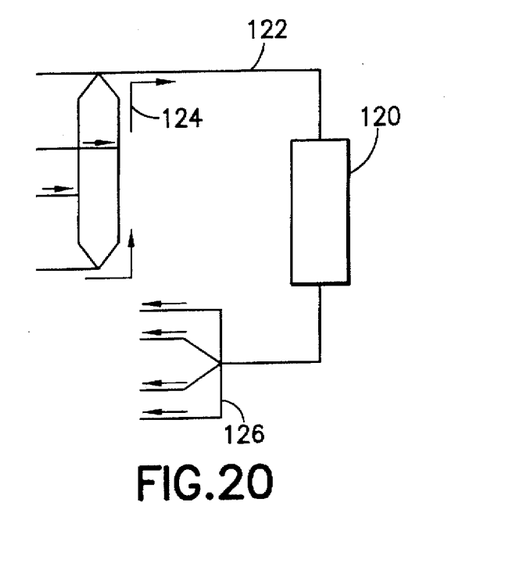
FIG. 20 is a schematic flow diagram of the oil flow circuit associated with the race/seal assembly.

FIG. 20 is a schematic flow diagram of the oil flow circuit associated with the race/seal assembly. As illustrated, the oil flow from the race/seal assembly flows therefrom in the direction indicated by arrow 124 to an oil flow line 122 for passage through oil filter 120, and is retained in passages 126 to the seal plug and the race/seal assembly, as described in connection with FIG. 14, with reference to the respective flow circuits including lubricant filters 228 and 292.

Figures 21, 22:
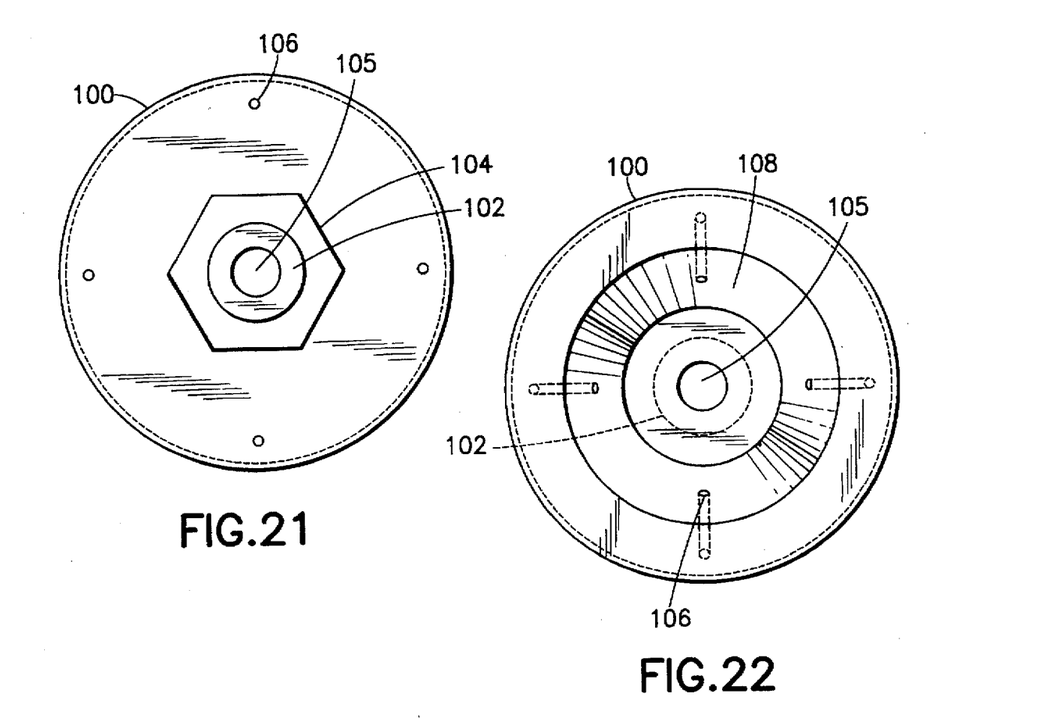
FIG. 21 is a front view of the race/seal assembly bearing plug.
FIG. 22 is a back elevation view of the race/seal assembly bearing plug of FIGS. 20 and 21.

FIG. 21 is a front view of the race/seal assembly. The metal body 100 is shown with the respective oil passages 106, and hex nut element 104 having rubber seal element 102 in a frontal cavity thereof, and with central opening 105 for passage of the engine shaft therethrough.

FIG. 22 is a back elevation view of the race/seal assembly of FIGS. 20 and 21. The metal body 100 on its rear side shows the oil flow passages 106 and the tapered race 108 surrounding the central opening 105 which is circumscribed by rubber seal element 102.

Figure 23:
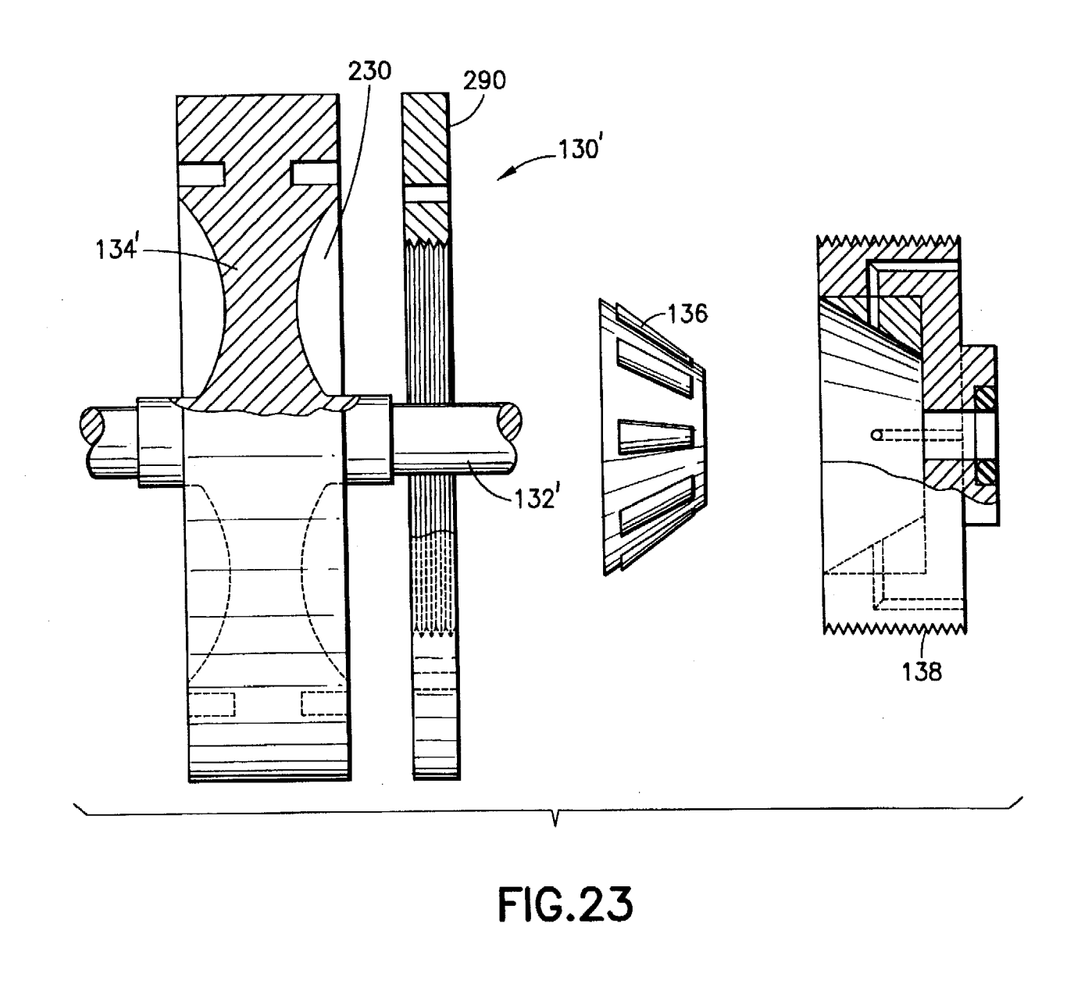
FIG. 23 is an exploded side elevation view of the bearing, race/seal assembly, oil slinger, and rotor of an internal combustion engine according to another embodiment of the invention.

FIG. 23 is an exploded side elevation view of the bearing 136 race/seal assembly bearing plug 138, side block 290, and oil slinger 230 of rotor 134, in exploded relationship to one another, to shown the details of construction thereof.

Figure 24:
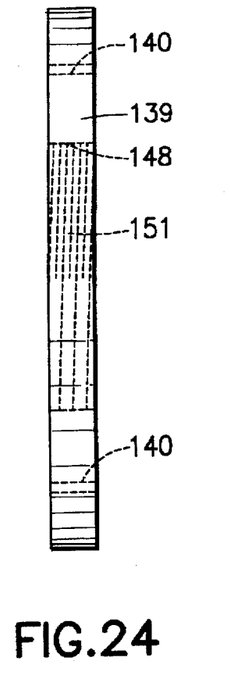
FIG. 24 is a side elevation view of the waffle element of the engine of the invention, in one embodiment.

FIG. 24 is a side elevation view of the side block (waffle) member 140, showing oil flow passages 140 therein and central opening 151 having threaded side surfaces 148, as shown. The bearing plug is complimentarily threaded on its exterior surface for threadable engagement with the side block.

Figure 25:
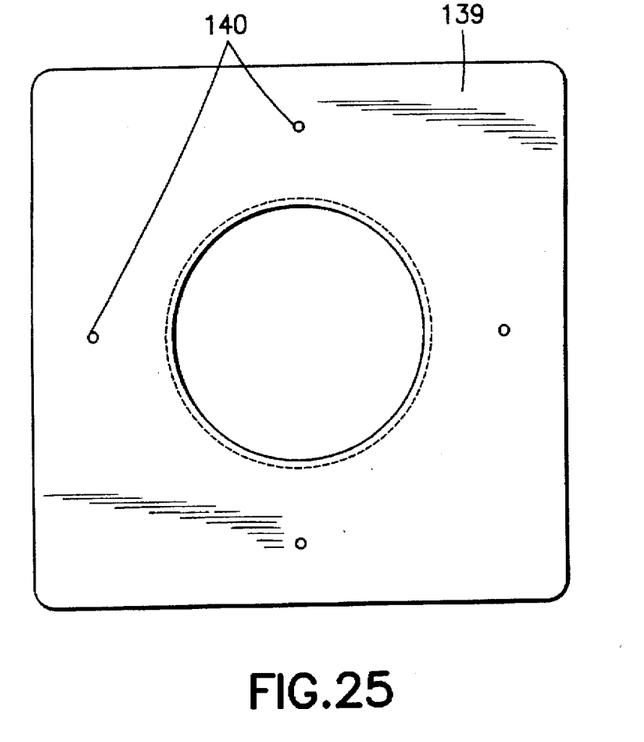
FIG. 25 is a from elevation view of the waffle element.

FIG. 25 is a front elevation view of the side block 139, showing the oil flow passages 140 therein.

Figure 26:
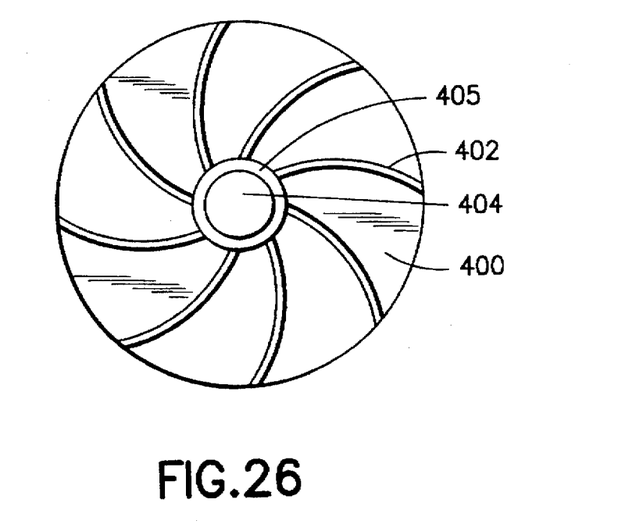
FIG. 26 is a top plan view of a mounted oil slinger according to another embodiment of the invention.

FIG. 26 is a top plan view of a mounted oil slinger 400 according to another embodiment of the invention, comprising swept-back vanes 402 on the main surface thereof, as mounted for rotation on shaft 404 by means of collar 405. As previously described, the collar 405 may be keyed or otherwise secured to the shaft, involving affixation and securement in any suitable manner.

While the invention has been described with respect to various illustrative embodiments, it will be recognized that numerous variations, modifications, and other embodiments are possible, and therefore the invention is to be broadly construed, as encompassing all such variations, modifications, and other embodiments.

What is claimed is:

1. A combustion engine, comprising a rotatable shaft, and an engine housing including a block having a cavity therein constructed and arranged to receive in said cavity a bearing and race/seal plug, a bearing in said cavity, and a race/seal plug engaging said block cavity and removably secured therein, said race/seal plug having (1) an opening therethrough for passage of the rotatable shaft therethrough, (2) a race/seal plug cavity receiving and engaging said bearing, and (3) having a front face formed for tool-assisted securing of the race/seal plug to the housing, said race/seal plug defining with said bearing a race/seal assembly, with said race/seal plug having lubricant flow passages therethrough communicating with the bearing of said race/seal assembly, with a lubricant slinger arranged in lubricant-receiving relationship to said bearing, and with said oil slinger, bearing, and race/seal plug being coaxially mountable on the engine shaft for rotation of the bearing and lubricant slinger, and with the lubricant slinger directing lubricant centrifugally, with means for conveying centrifugally directed lubricant in recirculation to the race/seal assembly bearing plug, for passage therethrough to said bearing.

2. An engine according to claim 1, further comprising an oil pump for recirculation of lubricant from a locus at which the lubricant is centrifugally received from the lubricant slinger, and recycling same to the race/seal assembly bearing plug.

3. An engine according to claim 1, wherein the oil slinger comprises a multiplicity of swept-back vanes.

4. An engine according to claim 1, wherein the lubricant slinger comprises a grooved structure.

5. An engine according to claim 1, wherein said bearing comprises a tapered roller bearing.

6. An engine according to claim 1, wherein the lubricant slinger comprises a collar secured to said engine shaft.

7. An engine according to claim 1, wherein the front face formed for tool-assisted securing of the race/seal plug to the housing, comprises a protrusion on the front face of the race/seal plug.

8. An engine according to claim 7, wherein the protrusion comprises a hexagonal-shaped protrusion.

9. An engine according to claim 7, wherein the protrusion contains a cavity, and a sealing element is disposed therein to seal around the rotatable shaft.

10. An engine according to claim 9, wherein the sealing element comprises a spring-tensioned seal element circumferentially compressively bearing on the rotatable shaft.

11. An engine according to claim 1, wherein the race/seal plug cavity receiving and engaging said bearing, is of truncated frustoconical shape, and said bearing comprises a tapered roller bearing.

12. A combustion engine, comprising a rotatable shaft, and an engine housing including a block having a cavity therein constructed and arranged to receive in said cavity a bearing and race/seal plug, a bearing in said cavity, and a race/seal plug engaging said block cavity and removably secured therein, said race/seal plug engaging said bearing and defining therewith a race/seal assembly, with said race/seal plug having lubricant flow passages therethrough communicating with the bearing of said race/seal assembly, with a lubricant slinger arranged in lubricant-receiving relationship to said bearing, and with said oil slinger, bearing, and race/seal plug being coaxially mountable on the rotatable shaft for rotation of the bearing and lubricant slinger, and with the lubricant slinger directing lubricant centrifugally, with means for conveying centrifugally directed lubricant in recirculation to the race/seal assembler bearing plug, for passage therethrough to said bearing, wherein the race/seal plug comprises a metal body having a protrusion on a front face thereof, and a central opening therethrough for accommodating passage of the shaft therethrough, said protrusion having a cavity therein with a seal element reposed in the cavity.

13. An engine according to claim 12, wherein the race/seal plug comprises a cylindrical metal body.

14. An engine according to claim 12, wherein the protrusion on the front face of the race/seal plug comprises a hexagonal protrusion.

15. An engine according to claim 12, wherein the seal element comprises a spring-tensioned seal element circumferentially compressively bearing on the rotatable shaft.

16. A combustion engine, comprising a rotatable shaft, and an engine housing including a block having a cavity therein constructed and arranged to receive in said cavity a bearing and race/seal plug, a bearing in said cavity, and a race/seal plug engaging said block cavity and removably secured therein, said race/seal plug engaging said bearing and defining therewith a race/seal assembly, with said race/seal plug having lubricant flow passages therethrough communicating with the bearing of said race/seal assembly, with a lubricant slinger arranged in lubricant-receiving relationship to said bearing, and with said oil slinger, bearing, and race/seal plug being coaxially mountable on the shaft for rotation of the bearing and lubricant slinger, and with the lubricant slinger directing lubricant centrifugally, with means for conveying centrifugally directed lubricant in recirculation to the race/seal assembly bearing plug, for passage therethrough to said bearing, wherein said lubricant slinger comprises a disc-shaped body of permeable material.

17. An engine according to claim 16, wherein said permeable material comprises a porous material.

18. An engine according to claim 16, wherein said permeable material comprises a semi-permeable material.

* * * * *

UNITED STATES PATENT AND TRADEMARK OFFICE
CERTIFICATE OF CORRECTION

PATENT NO. : 5,724,934
DATED : March 10, 1998
INVENTOR(S) : Faraci et al.

It is certified that error appears in the above-indentified patent and that said Letters Patent is hereby corrected as shown below:

Column 2, Line 51        change "from" to -- front --.
Column 4, Line 25        change "oft he" to -- of the --.
Column 5, Line 30        change "retained" to -- returned --.
Column 5, Lines 44-47    replace current text with -- Figure 23 is an exploded side elevation view of the bearing 136, race/seal assembly bearing plug 138, side block 290, and oil slinger 230 of rotor 134' mounted on shaft 132', in exploded relationship to one another, forming assembly 130', to show the details of construction thereof. --.
Column 7, Line 2         change "assembler" to -- assembly --.

Signed and Sealed this

Sixteenth Day of June, 1998

Attest:

BRUCE LEHMAN

Attesting Officer

Commissioner of Patents and Trademarks